No. 616,792. Patented Dec. 27, 1898.
A. LUKE.
BELT PLACER AND TIGHTENER.
(Application filed Aug. 18, 1898.)
(No Model.) 3 Sheets—Sheet 1.
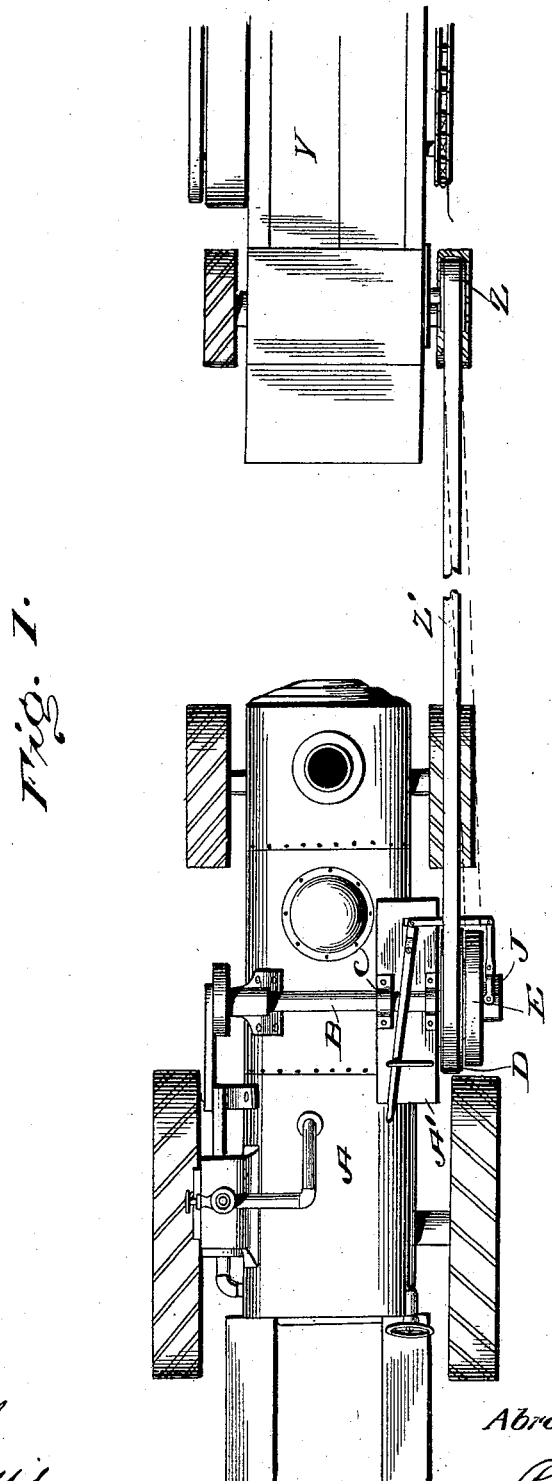
Fig. I.
Witnesses
Inventor
Abraham Luke
by R.S.&A.B. Lacey
Attorneys No. 616,792. Patented Dec. 27, 1898.
A. LUKE.
BELT PLACER AND TIGHTENER.
(Application filed Aug. 18, 1898.)
(No Model.) 3 Sheets—Sheet 2.
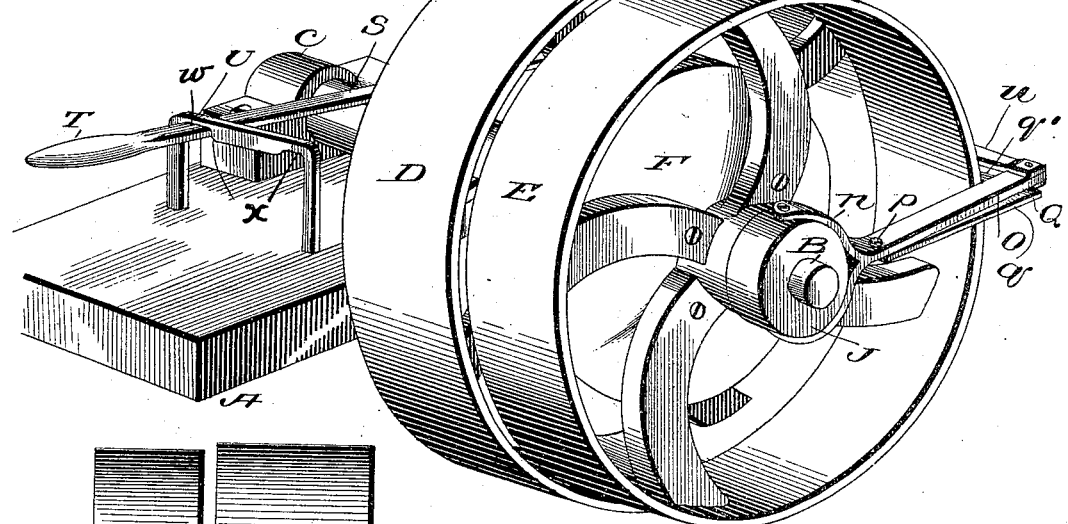
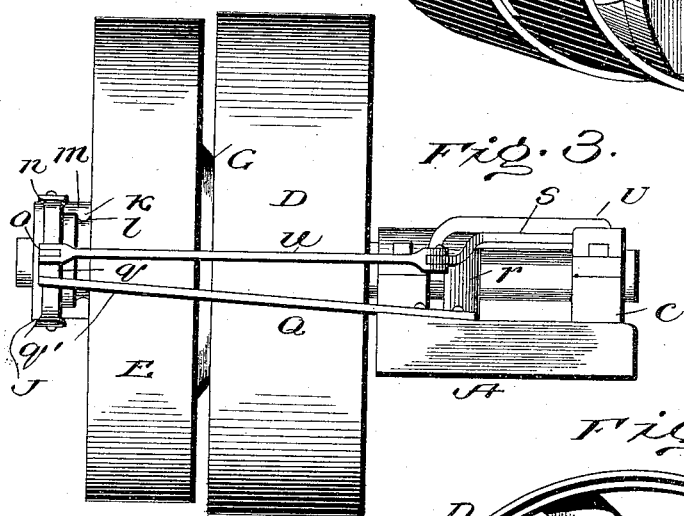
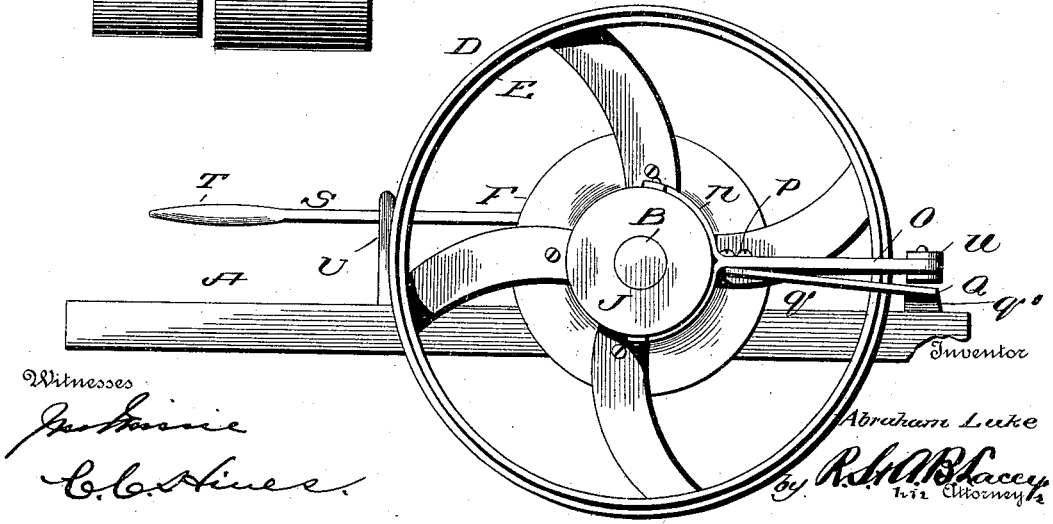
Inventor
Abraham Luke
by R. S. & A. B. Lacey
his Attorneys
Witnesses No. 616,792. Patented Dec. 27, 1898.
A. LUKE.
BELT PLACER AND TIGHTENER.
(Application filed Aug. 18, 1898.)
(No Model.) 3 Sheets—Sheet 3.
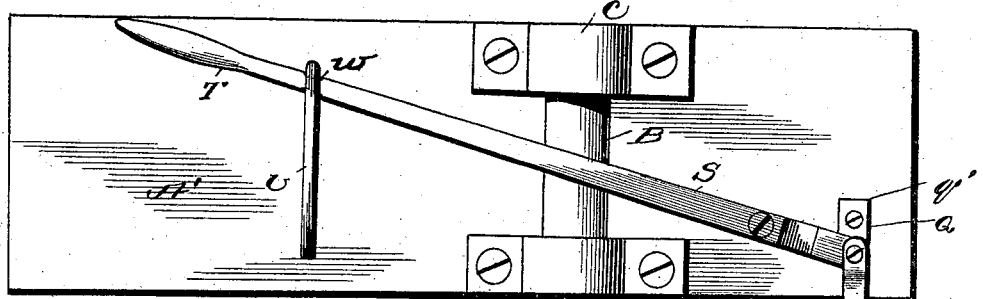
Fig. 4.
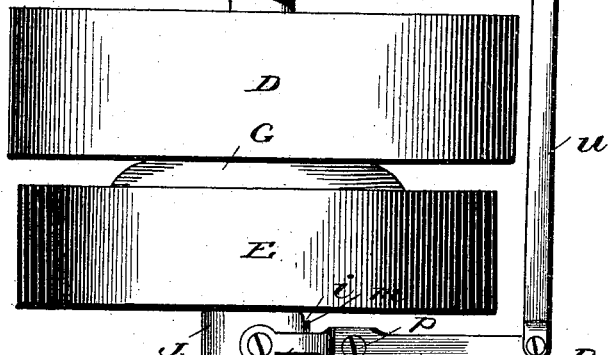
Fig. 6.
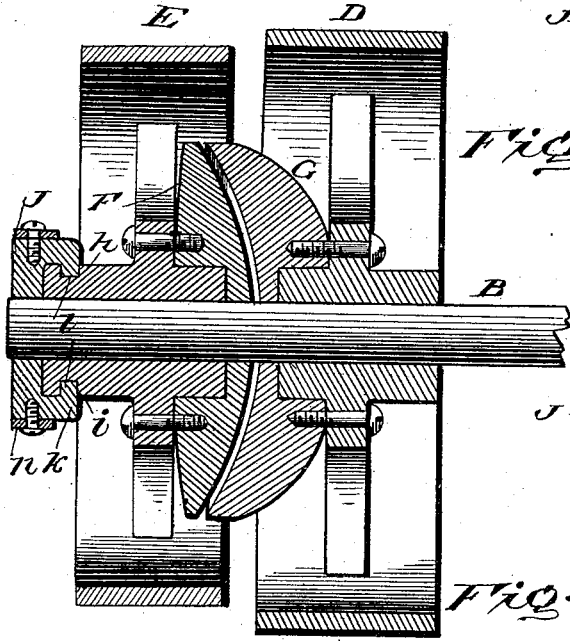
Fig. 7.
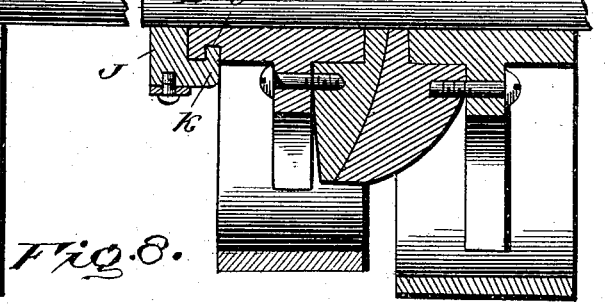
Fig. 8.
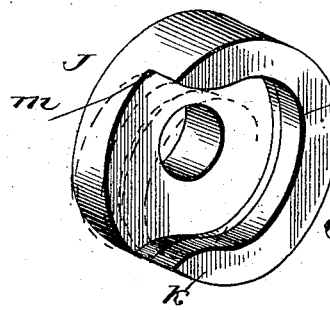
Witnesses
Inventor:
Abraham Luke,
by R. W. P. Lacey
his Attorneys

UNITED STATES PATENT OFFICE.

ABRAHAM LUKE, OF ELKHART, INDIANA.

BELT PLACER AND TIGHTENER.

SPECIFICATION forming part of Letters Patent No. 616,792, dated December 27, 1898.

Application filed August 18, 1898. Serial No. 688,944. (No model.)

*To all whom it may concern:*

Be it known that I, ABRAHAM LUKE, a citizen of the United States, residing at Elkhart, in the county of Elkhart and State of Indiana, have invented certain new and useful Improvements in Belt Placers and Tighteners for Portable Engines; and I do hereby declare the following to be a full, clear, and exact description of the invention, such as will enable others skilled in the art to which it appertains to make and use the same.

My invention relates to an improved belt adjuster and tightener for portable engines of the type generally used for agricultural purposes.

For reasons well known to those versed in the art great difficulty has been heretofore experienced in placing the drive-belt on the band-pulley of an engine after the latter has been placed in proper position with reference to the thresher or other machine to be driven.

The object of the present invention is to obviate all annoyance and trouble and facilitate the placing of the drive-belt on the pulley and at the same time take up the slack and tighten the said belt; also, to provide a simple and effective form of clutch and improved operating mechanism therefor whereby the loose pulley may be readily and conveniently shifted and thrown into engagement with the band-pulley or drive-wheel.

The invention will be more particularly set forth hereinafter, reference being had to the parts which are indicated by similar reference-letters throughout the several views in the accompanying drawings, in which—

Figure 1 is a top plan view of a portable engine and portion of a threshing-machine, showing my invention in use in connection therewith. Fig. 2 is a detached perspective view of a portion of the drive-shaft, the band-pulley, and loose supplemental pulley carried thereby and the clutch mechanism coacting therewith. Fig. 3 is an end elevational view of the same. Fig. 4 is a top plan view. Fig. 5 is a side elevational view looking toward the loose supplemental pulley. Fig. 6 is a longitudinal section showing the normal position of the parts when the loose pulley is disengaged. Fig. 7 is a similar view showing the position of the parts when the loose pulley is engaged with the band-pulley. Fig. 8 is a perspective view of the shifting collar.

The engine A is portable and represents any of the well-known forms of traction-engines used for farming and agricultural purposes.

The thresher or other machine to be operated is represented by Y and forms no part of the present invention, it being illustrated to show the application of the invention.

Z indicates a band-pulley on the drive-shaft of the thresher or other machine to be connected up with and operated by the engine.

A' represents a shelf or bracket mounted on the engine and carrying bearings $c$ for the drive-shaft B, upon which the band-wheel D is mounted.

Z' is a drive-belt which is supported at its ends when in operative position on the band-wheels D and Z.

The shaft B is made longer than usual and projects beyond the band-wheel D to receive the supplemental loose pulley E, which is of slightly less diameter than the band-wheel. The supplemental pulley is fitted to slide longitudinally on the shaft and is provided on its inner side with a clutch disk or head F, having a convex outer face which is adapted to frictionally engage the concaved outer face of a complemental clutch-disk G on the adjoining side of the band-wheel. This form of friction-clutch, while deemed preferable on account of its simplicity of construction, is not essential, as any other form of clutch suitable for the purpose may be employed.

The hub $h$ of the supplemental pulley is extended on its outer side and formed with an annular groove $i$, and mounted on the shaft is a shifting collar J, provided with a segmental flange $k$, which partially encompasses said hub and is formed with a tongue $l$, which projects into the groove thereof. This flange is cut away, as at $m$, and is beveled at its ends, so that it may be readily and conveniently applied and removed. By sliding this collar in or out relatively to the band-wheel it will be seen that the loose pulley will be moved toward or from said band-wheel and the clutch-disks thereon engaged or released from engagement to cause the loose pulley to revolve with the band-wheel and shaft or remain at rest. To the collar is connected a shifting yoke or fork n, carried by a lever O, pivoted at p to the short arm q of an approximately L-shaped bracket Q, the long arm q' of which is secured at its inner end to the shelf or bracket A' and extends outwardly therefrom past the pulleys. Projecting upward from said shelf or bracket is a short post r, and to this is pivoted an operating-lever S, provided at one end with a handle T, whereby it may be conveniently operated by the engineer or driver from his position on the engine. A link or connecting-rod u pivotally connects the adjoining ends of the two levers O and S, so that by moving the handle end of the latter in one direction or the other the shifting collar will be operated to move the supplemental pulley and its clutch-disk into and out of engagement with the clutch-disk on the band-pulley. The handle end of the operating-lever S is confined in a loop or stirrup v and is notched at w to engage notched portions x therein, whereby it will be held securely against casual disengagement in either of its adjusted positions.

The operation of the invention is as follows: The supplemental pulley is released from engagement with the band-pulley, so as to revolve freely on the shaft B, the drive-belt Z' being preliminarily placed by hand on the band-pulley Z of the machine to be driven and on the said supplemental pulley. The engine is then run back and forth in the usual manner to bring the belt-pulley E into alinement with the pulley Z without moving the belt, and after the engine has been properly adjusted and its position fixed the hand-lever is operated to shift the supplemental pulley into engagement with the band-pulley, so as to cause it to revolve therewith and with the shaft. When this is done, the drive-belt will extend from the pulley Z on the thresher or other machine to be driven to the supplemental pulley, as shown in broken lines in Fig. 1. When the engine is started, however, the supplemental pulley will revolve with the band-pulley and shaft and the belt will creep and pass from said supplemental pulley onto the band-pulley automatically or with very little assistance, and at the same time will be tightened to the proper tension, owing to the larger diameter of the band-wheel.

The operation just described is effected by reason of the great length of the belt, which enables it to easily conform to the larger diameter of the band-pulley and to its natural tendency to creep laterally or sidewise when out of proper alinement.

Having thus described the invention, what is claimed as new is—

1. The combination, with the belt-pulley of a machine to be driven, of a portable engine provided with a drive-shaft, a drive-pulley fixed on said shaft and carrying a clutch member, a loose supplemental pulley slidably mounted on the shaft and carrying a complemental clutch member, a drive-belt passed around the said pulley of the machine to be driven and supplemental pulley, and means for operating the supplemental pulley to throw the clutch member thereof into and out of engagement with the clutch member on the drive-pulley, whereby when the said supplemental pulley is out of alinement with the belt-pulley on the machine to be driven and is thrown into operation, the belt will creep therefrom onto the drive-pulley, substantially as described.

2. The combination, with the belt-pulley of a machine to be driven, of a portable engine provided with a drive-shaft extended at one side thereof, a drive-pulley fixed on said shaft and carrying a clutch member, a loose supplemental pulley slidably mounted on the extended end of the shaft exteriorly of the drive-pulley and carrying a complemental clutch member, a shifting collar detachably mounted on the projecting hub of the supplemental pulley, a drive-belt passed around the said pulley on the machine to be driven and supplemental pulley, and a lever connected with the collar for operating the supplemental pulley to throw the clutch member thereof into and out of engagement with the clutch member on the drive-pulley, whereby when the said supplemental pulley is out of alinement with the belt-pulley on the machine to be driven and is thrown into operation, the belt will creep therefrom onto the drive-pulley, substantially as described.

3. In a portable engine, the combination of a drive-shaft extended at one end thereof, a drive-pulley fixed on said shaft and provided on its outer side with a clutch member, a relatively smaller supplemental pulley slidably mounted on the extended end of the shaft and provided on its inner side with a complemental clutch member, a bracket on the engine, and a lever mounted on said bracket and connected with the supplemental pulley to move the same toward and from said drive-pulley, said lever being provided with a handle arranged so as to be conveniently operated from the engineer's position, substantially as described.

In testimony whereof I affix my signature in presence of two witnesses.

ABRAHAM LUKE.

Witnesses:
CLYDE RAYMER,
TULLAR J. WOODARD.